US006805030B2

(12) United States Patent
Englar et al.

(10) Patent No.: US 6,805,030 B2
(45) Date of Patent: Oct. 19, 2004

(54) POTATO-STRIP CUTTING DECELERATION SYSTEM

(75) Inventors: James Englar, New Milford, CT (US); Juan Gonzalez, New Milford, CT (US); Scott Howell, New Milford, CT (US); David Gottberg, Moses Lake, WA (US)

(73) Assignee: J.R. Simplot Company, Boise, ID (US)

(*) Notice: Subject to any disclaimer, the term of this patent is extended or adjusted under 35 U.S.C. 154(b) by 321 days.

(21) Appl. No.: 10/073,086

(22) Filed: Feb. 9, 2002

(65) Prior Publication Data

US 2002/0122859 A1 Sep. 5, 2002

Related U.S. Application Data

(60) Provisional application No. 60/268,043, filed on Feb. 12, 2001.

(51) Int. Cl.[7] .............................. A23L 1/00; B26D 1/03

(52) U.S. Cl. ............................... 83/402; 83/98; 83/858; 83/932; 99/537; 99/538

(58) Field of Search ................................ 83/24, 27, 98, 83/402, 858, 932; 99/537, 538, 516; 426/402, 518

(56) References Cited

U.S. PATENT DOCUMENTS

| | | | | |
|---|---|---|---|---|
| 3,024,821 A | | 3/1962 | Bean | |
| 3,109,468 A | | 11/1963 | Lamb et al. | |
| 3,116,772 A | | 1/1964 | Lamb et al. | |
| 3,208,625 A | | 9/1965 | Trabacchi | |
| 4,082,024 A | | 4/1978 | Hodges et al. | |
| 4,135,002 A | | 1/1979 | Hodges et al. | |
| 4,372,184 A | | 2/1983 | Fisher et al. | |
| 4,423,652 A | | 1/1984 | Winslow | |
| 4,538,491 A | | 9/1985 | Henneuse | |
| 4,614,141 A | | 9/1986 | Mendenhall et al. | |
| 4,807,503 A | | 2/1989 | Mendenhall | |
| 5,046,388 A | * | 9/1991 | Mendenhall | 83/98 |
| 5,168,784 A | | 12/1992 | Foster et al. | |
| 5,179,881 A | | 1/1993 | Frey et al. | |
| 5,394,780 A | | 3/1995 | Foster et al. | |
| 5,421,226 A | * | 6/1995 | Mendenhall | 83/402 |

* cited by examiner

*Primary Examiner*—George C. Yeung
(74) *Attorney, Agent, or Firm*—Kelly Lowry & Kelley, LLP

(57) ABSTRACT

The invention relates to a food processing system. A fluid conduit of the system is configured for directing the food carried in a fluid medium along a food path. The system has a food inlet operatively associated with the fluid conduit for feeding the food into the conduit, and a pump operatively associated with the conduit for pumping the fluid through the conduit in a fluid stream direction. A processor unit is associated with the conduit, disposed along the food path, and includes a tool configured and associated with the conduit for performing a processing operation on the food, such as cutting potatoes into french fry strips. The system also has a deceleration element operatively associated with the conduit and configured for decelerating the fluid and carried food along the food path while maintaining the fluid flow substantially free of recirculation vortices.

22 Claims, 3 Drawing Sheets

POTATO-STRIP CUTTING DECELERATION SYSTEM

CROSS-REFERENCE TO RELATED APPLICATIONS

This application claims the benefit of provisional application No. 60/268,043, filed Feb. 12, 2001, the content of which is expressly incorporated herein by reference thereto.

FIELD OF THE INVENTION

The invention relates to a food processing system with a deceleration element for decelerating food in a fluid medium after it is passed through a processing unit. More particularly, the invention relates to a food cutting system, such as for cutting potato strips, with a deceleration element that minimizes flow-vortices that would interfere with the optimum processing of the food or that would damage the processed food.

BACKGROUND OF THE INVENTION

Over the years, the design and operation of food processing equipment has developed to faster process food with the goal of reducing processing costs. These savings are typically passed along to customers in the form of price reductions or maintenance of prices in times of inflation. Unfortunately, these enhancements in productivity are often obtained at the expense of efficiency and lower product quality.

For example, in typical systems for cutting potato tubers into strips in the manufacturing of french fries, in the cutting operation alone, greater than 10% of the solids are lost due to the liberation of raw starch and the generation of potato matter that does not meet the size specification for french fries. These solid pieces are generally referred to as slivers and nubbins, and while edible, must be converted into other products, thus incurring additional expense. In a high volume french fry manufacturing-operation, a small savings in recovery can lead to greatly enhanced yield of premium product and a large overall cost savings.

Some potato cutting systems move potatoes carried in water at a high speed through a water knife cutting system to cut the potatoes into strips. After passing through the water knife, the water and the carried strips are decelerated. In this deceleration process, however, the flow of the water tends to separate, which leads to increased strip breakage. This increases the waste produced by the system and decreases efficiency.

Traditional potato cutting machines also have a transition region between a primary deceleration stage and a dewatering station, where the water is drained from the cut potatoes. It is desirable to maintain back water pressure to keep the pipes in the system filled. Some transitions have included a C-shaped tube, elbow tube, or a flap near the exit of the tube to maintain back pressure. These devices, however, increase the likelihood of flow separation and breakage of the cut potato strips, which become the less desirable slivers or nubbins.

Accordingly, there is a need for a high volume manufacturing system that will efficiently cut french fries in long strips without excessive waste. The present invention now satisfies this need.

SUMMARY OF THE INVENTION

The invention relates to a food processing system. The preferred system is for cutting potatoes into french-fry strips, and has a fluid conduit configured for directing the food carried in a fluid medium along a food path. A food inlet is operatively associated with the fluid conduit for feeding the food into the conduit. A pump is operatively associated with the conduit for pumping the fluid through the conduit in a fluid stream direction, and a processor unit is associated with the conduit, disposed along the food path, and comprising a tool configured and associated with the conduit for performing a processing operation on the food. A deceleration element is operatively associated with the conduit and configured for decelerating the fluid and carried food along the food path while maintaining the fluid stream substantially free of recirculation vortices. Reducing or eliminating any significant recirculation vortices and the back flow associated therewith substantially increases the efficiency of the system, as a smaller fraction of the processed food, such as the cut potato strips, is broken.

In the preferred embodiment, the pump and conduit are configured such that the fluid enters the deceleration element at a first velocity. The deceleration element is configured for decelerating the fluid to a second velocity that is less than about 40% of the first velocity, and preferably less than about 20% of the first velocity.

To decelerate the fluid, which for cutting potatoes is preferably water, the deceleration element includes a tapered conduit having a longitudinal axis extending along the food path and an expansion angle of about 4.5° or less, more preferably about 3° or less, and most preferably about 2.5° or less. The preferred tapered conduit is substantially conical and substantially all of its wall portions are oriented at or below these angles to the stream direction.

The deceleration element is preferably configured to significantly reduce or eliminate substantially any back flow of the fluid of sufficient intensity and profile to significantly slow any of the carried food in relation to adjacent carried food disposed primarily outside the back flow. The deceleration element is also preferably configured to significantly reduce or eliminate back flow of the fluid that would be sufficient to substantially stop or cause the carried food to move backwards compared to the stream direction. Also, the deceleration element configuration is selected such that the fluid flow within the deceleration element is substantially free of flow separation, remaining substantially attached to the walls of the deceleration element.

The deceleration element in the preferred embodiment is disposed downstream from the processor unit along the food path and preferably substantially immediately downstream thereof. The preferred processor unit comprises a cutter, preferably with a plurality of stationary blades, disposed along the food path and configured for cutting the food as it passes therethrough. The pump and conduit are configured for pumping the fluid and carried food along the food path at a sufficient speed for cutting the food at the cutter.

The preferred embodiment of the invention additionally includes an alignment unit disposed upstream of the processor unit and configured for aligning and feeding the food in a predetermined orientation into to the processor unit. Furthermore, a separating unit is disposed along the food path and configured for separating the processed food from the fluid.

A transition portion of the fluid conduit preferably extends substantially from the deceleration element to the separating unit. The preferred transition portion is configured for maintaining the fluid flow substantially free of recirculation vortices. In one embodiment, any bends in the transition portion are configured to substantially prevent flow separation of the fluid. In another embodiment, the transition portion is substantially straight.

In the preferred method of processing the food, the food is introduced into the fluid, and the fluid is fed with the food through a food processor unit at a first velocity for conducting a food processing operation on the food. The fluid with the food is then decelerated to a second velocity without producing substantial back flow of the fluid.

The inventive system and method enable a significantly increased production of processed food, because breakage of processed food, at least during deceleration is reduced by a substantial amount.

DETAILED DESCRIPTION OF THE PREFERRED EMBODIMENTS

Figure 1:
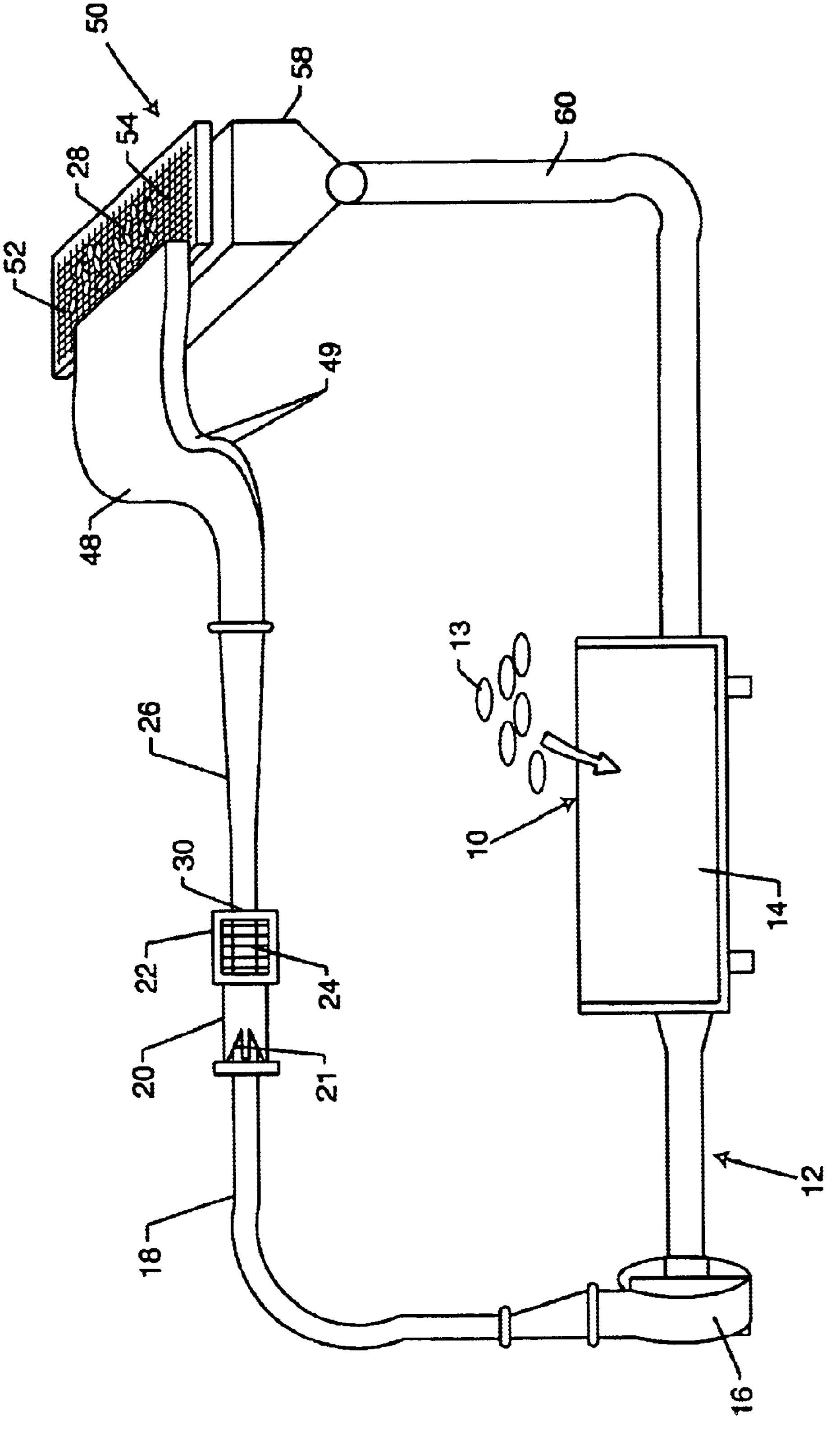
FIG. 1 is a diagram of an embodiment of a potato-cutting system constructed according to the invention.

Referring to FIG. 1, a preferred embodiment of a food processing system is a potato cutting system. The system includes a fluid conduit 12 that is configured to transport the fluid and food through the system, and preferably includes a series of tubes. The conduit 12 passes through several subsystems for pumping and processing the food.

A food inlet 10 is associated with the conduit 12 for feeding food into the system and into the conduit 12. The food inlet 10 is preferably configured and dimensioned to receive a plurality of whole potatoes 13 to be processed, and is associated with a vortex tank 14. The vortex tank 14 has pumps that pressurize the system to a pressure sufficient to drive the potatoes 13 at a velocity for processing in the system.

The conduit 12 of this embodiment directs the water and carried potatoes 13 to a pump 16, which is preferably a centrifugal pump, although other types of fluid pumps can be employed. The pump 16 is associated with the rest of the components of the system to pump the water through the components and preferably in a circuit through the fluid conduit 12. The pumped water carries the potatoes 13 along a food path through the system.

The potatoes 13 are pumped through a tuber singulation sweep 18 and into an alignment device 20 that is arranged for aligning the whole potatoes 13 substantially in a predetermined orientation relative to fluid conduit 12 and the food path. The alignment device 20 is preferably disposed upstream of a food processing unit, which preferably includes a potato-cutter in cutting block 22. The alignment device 20 feeds the whole potatoes 13 into the cutting block 22 in a desired alignment, which in the preferred embodiment is determined by the orientation provided by the alignment device 20.

Figure 2:
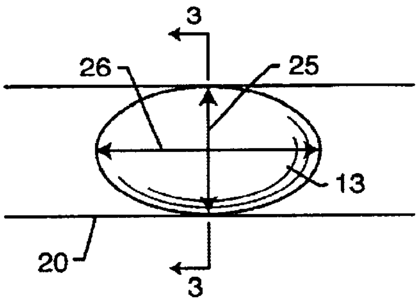
FIG. 2 is a longitudinal cross-sectional view of an alignment device of the potato-cutting system with potato passing therethrough.
Figure 3:
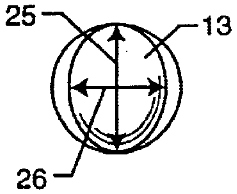
FIG. 3 is a lateral cross-sectional view thereof along line III—III in FIG. 2.

Referring to FIGS. 2 and 3, the narrow diameter of potatoes is also called, “flat side diameter” 25, and the widest diameter is also called, “round side diameter” 23. The alignment device 20 is preferably selected according to the range of round side diameters of the potatoes 13 that will be processed. The system preferably has tapered rollsizers and distribution gates to separate the potatoes into several product streams of different sizes, and preferably into three streams, each of which can pass through a different alignment device. The side diameters 23,25 of the potatoes 13 are preferably accommodated by the alignment device 20, so that the longest dimension 26 of the potato 13 is generally aligned with the direction of the water stream to provide efficient subsequent cutting. Other processes performed on the potatoes 13 may benefit from other alignment systems and methods. The alignment tube of the alignment device 20 is wide enough to allow the potatoes 13 to pass through without plugging the tube, while also being narrow enough to provide the proper potato alignment for the cutting or other process to be performed. In the preferred cutting operation, proper alignment provides longer strips, while poor alignment results in shorter strips.

The alignment device 20 preferably includes a Jackson alignment cone, which is most preferable for use with potatoes of large round side diameter. A Jackson alignment cone, also called a Jackson tube, has stiff vanes 21 that capture and align potatoes as the orifice narrows near the discharge end of the cone. This device is preferably for use with potatoes 13 that have a large round side diameter.

Other types of alignment devices can be employed, such as a GME alignment tube or a reducing tube. A GME alignment tube is conical tube made of a firm rubber. The GME alignment tube is most preferable for use with potatoes 13 with a small round side diameter. The potatoes 13 passing through a GME alignment tube are aligned as they reach a point in the tube that is less than or equal to their round side diameter. A reducing tube is made of metal and is longer than the GME alignment tube. It otherwise works in a similar way that the potatoes 13 are aligned as they pass through a point in the tube that is less than or equal to their round side diameter 23.

The cutting block 22 preferably includes a water-knife cutting system for the high volume manufacture of straight-cut raw french fries. Alternative embodiments have cutters for cutting differently shaped raw french fries or other produce or food products. The water-knife system employed is preferably of sufficient efficiency to effectively cut an entire line flow of potatoes 13 with only two or three water-knives. To prevent the potatoes 13 from rotating as they exit the alignment device 20, the discharge end of the alignment device 20 is preferably disposed inside the cutting block 22 near the blades 24.

The speed of the pumps used in the system is preferably adjustable to accommodate different potato sizes and turger pressures, as potatoes that come directly from farming fields have a high turger pressure that makes them brittle, while stored potatoes have a lower turger pressure and are more flexible. Also, the pump is preferably run as slowly as possible to produce smooth cuts through the potatoes 13, but rapidly enough to keep the potatoes 13 from plugging up the system and any part of the conduit 12. The water pressure moves the whole potatoes 13 through an alignment tube to the blade grid 24 of the water knife, preferably at the center of the blade grid 24 and between about 10 and 60 ft/sec, and more preferably between about 20 and 40 ft/sec. The blades of the water knife of this embodiment cut the potatoes 13 lengthwise into strips 28.

The system is preferably set up to reduce common problems that can develop. For example, if the vanes inside the Jackson tube are damaged or dislodged, the potatoes 13 may not be centered when they engage the cutting block 22. This can cause the potatoes 13 to shatter or be cut off-center. If the water pressure in the system drops, the blades 24 may become too dull, or foreign material may get stuck in the cutting block 22. This can cause the cutting action of the water knife to stop and the potatoes 13 to plug the line.

The raw potato strips 28 exit the water knife preferably moving between about 10 and 40 ft/sec, and more preferably between about 20 and 30 ft/sec. Upon exiting the cutting block 22, the strips 28 travel through a deceleration element 26 downstream of the cutting block 22. The deceleration element 26 is configured for decelerating the water and the cut potato strips 28 that are carried therein. The preferred embodiment has a connecting pipe 30 connected to the exit of the cutting block 22 that maintains the substantially the same width or diameter as in the cutting block or the outlet thereof over a short distance sufficient to ensure that the potato strips 28 completely clear the blade grid 24 prior to decelerating, although an alternative embodiment does not have a connecting pipe.

The preferred deceleration element 26 includes a tapered tube with a width or diameter that increases in the downstream direction from the side of the cutting block 22. This increasing diameter increases the cross-flow area of the tube which serves to decelerate the water and carried strips 28, and thus provides a first stage of deceleration. The deceleration element 26 preferably comprises a substantially conical pipe with an upstream diameter of preferably about 1–5 inches and a downstream diameter of preferably about 6–10 inches. For processing small potatoes, an upstream diameter of about 2–3 inches is preferred and most preferably about 2.5 inches, and for medium potatoes, an upstream diameter of about 3–4 inches is preferred and most preferably about 3.5 inches. The downstream diameter is preferably about 6–10 inches and most preferably about 8 inches.

The taper of the pipe of the deceleration element 26 significantly reduces the speed of the potatoes from the inlet to the outlet of the deceleration element 26. Preferably, the deceleration element 26 is configured for reducing the velocity from an upstream velocity to a downstream velocity at an opposite end of the tapered portion of less than about 40% of the upstream velocity. More preferably, the downstream velocity is less than about 20% of the upstream velocity, and most preferably between about 5 and 15% thereof. For a preferred upstream velocity of about 24 ft/sec at the exit of the cutting block 22 and the entrance of the deceleration element 26, a preferred downstream velocity of the flow at the exit of the deceleration element is about 2.4 ft/sec.

Figure 4:
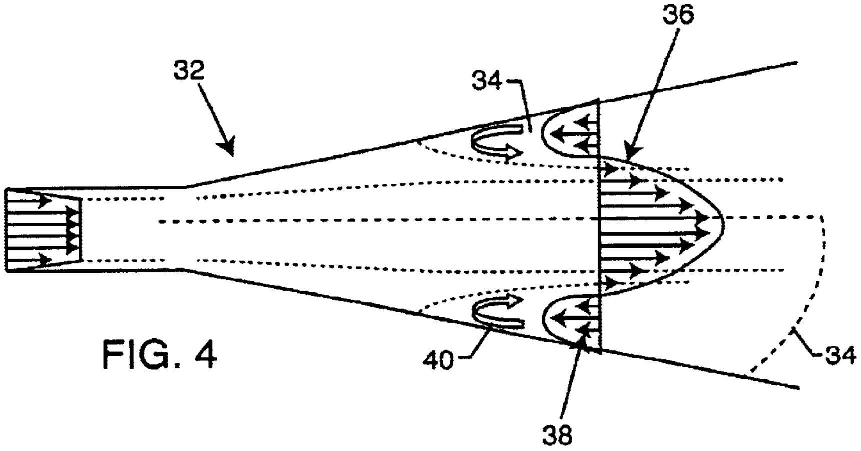
FIG. 4 is a cross-sectional view of a flow-deceleration pipe with a rapidly increasing diameter and the flow pattern therein.

A cone or diffuser of a deceleration element 32, with a large expansion or taper angle 34 measured from the center of the cone, is shown in FIG. 4. If the expansion angle is too large, the flow may separate, creating back flow conditions instead of spreading uniformly. Back flow can result from flow separation, which causes the water flow at the walls of the deceleration element 32 to move backwards relative to the main direction of flow at the center of the deceleration element 32. The large expansion angle of the deceleration element 32 results in flow separation of the water from the wall of the deceleration element 32 and a thick boundary layer 34. As the expansion angle is too large, the viscous boundary layers break away from the walls of the pipe, due to the presence of an unfavorable pressure gradient in the diffuser, and cause flow separation. FIG. 4 also shows a cross-sectional flow profile 36 that is very uneven, with uneven forward flow velocities near the center of the deceleration element 32 and including thick regions of back flow 38 and recirculation vortices 40 in the boundary layer 34. The flow is shown separated from the wall of the deceleration element 32 where the annular recirculation vortex 40 is located.

Such flow separation, recirculation vortices 40, and back flow can significantly reduce the efficiency of the potato cutting machine. Potato strips 28 or portions thereof that are close to the wall may be caused to rotate rapidly or stop forward motion or even drift backwards in the recirculating flow and collide with other strips 28, causing breakage. If the strips are feathered significantly, they may be even more susceptible to breaking.

Figure 5:
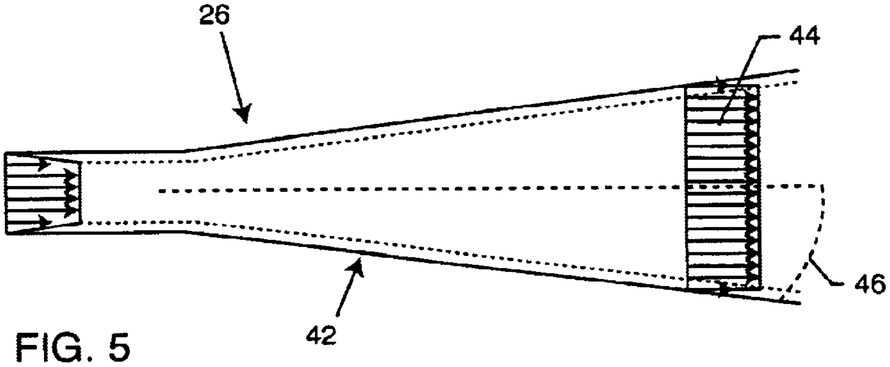
FIG. 5 is a cross-sectional view of the deceleration element of FIG. 1 and the flow pattern therein.

The diffuser of the deceleration element 26, which is shown in cross-section in FIG. 5, has a smaller expansion angle 46. In this deceleration element 26, the flow of water and carried strips 28 remains attached to the wall of the diffuser, producing a very small boundary layer 42 and no significant recirculation verifies, if any. Also, the direction of the flow profile 44 is in the downstream direction substantially across the entire cross-section of the diffuser of the deceleration element 26, and there is little velocity gradient across the profile outside the thin boundary layer.

As rapid expansion of a diffuser after the cutting block causes flow separation that increases strip breakage, the diffuser is preferably made as long as practicable in order to avoid flow separation and to minimize the velocity gradient that leads to strip 28 rotation. The longer diffuser allows the raw potato strips 28 to decelerate gently and minimizes the strip breakage that reduces the output of usable potato strips and decreases the efficiency of the system. The maximum expansion angle usable in any particular setup, however, can be calculated by modeling the fluid flow with the aid of computational fluid dynamics, with the consideration that when particles such as potato strips are added to the stream, the flow is disturbed, thus increasing the chance of flow separation once the strips enter the system.

The present invention thus helps to reduce strip breakage with a system designed to optimize deceleration, while minimizing or eliminating flow separation and back flow, within a range of flow rates. The diffuser reduces the flow velocity by slowly expanding the cross-sectional area of the tubes. To keep the flow attached to the diffuser wall and prevent flow separation in the potato-cutting process, the preferred expansion angle is less than 5°, more preferably less than about 4.5°, more preferably less than about 3°, more preferably less than about 2.5°, and most preferably less than about 2°. The expansion angle should be sufficient to slow the flow by the desired amount, and preferably the expansion angle is greater than about 0.1° and more preferably greater than about 1°. Also, alternative embodiments of the deceleration element can have non-circular cross-sections, but with walls oriented and cross-sectional areas in planes perpendicular to the direction of the fluid stream increasing sufficiently to slow the flow while avoiding flow separation, recirculation vortices, and back flow.

The preferred deceleration element 26 is configured to reduce or substantially eliminate any back flow of the fluid that is sufficient to significantly slow any of the carried strips 28, which are disposed primarily in any of said back flow, in relation to adjacent strips 28 that are disposed primarily outside of the back flow. The deceleration element 26 is preferably configured to reduce or eliminate any back flow of the fluid that is sufficient to stop or cause the carried strips 28 to move backwards compared to the water stream direction.

After exiting the deceleration element 26, the strips 28 are further decelerated in and dewatered as they are conveyed. Breakage of the strips can also occur during further deceleration and transition between the diffuser and dewatering system in a second stage of deceleration. The second stage of deceleration in the preferred embodiment takes place in a transition portion 48 of the conduit 12 between the deceleration element 26 diffuser and the dewatering system 50. Preferably, the transition portion 48 is elevated in the downstream direction and expands further to decelerate the stream before the strips 28 exit the conduit 12 and enter the dewatering area 50. The increasing elevation provides back-pressure to keep the conduit 12 filled with water. The outlet of the transition portion 48 is also preferably flattened to more smoothly deposit the strips 28 onto belt 52 in the dewatering are 50.

Figure 6:
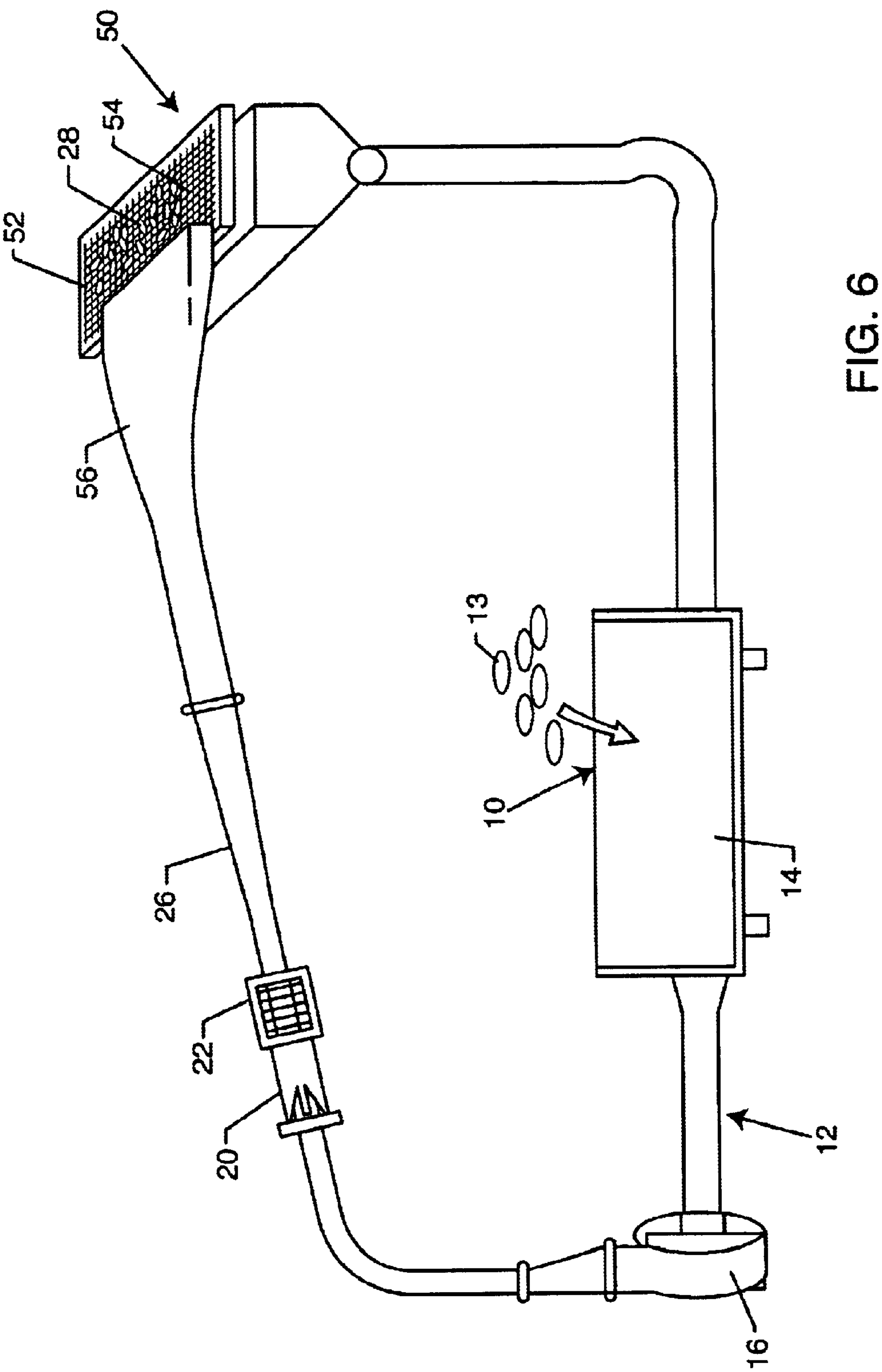
FIG. 6 is a diagram of another embodiment of a potato-cutting system constructed according to the invention.

The transition portion 48 of the embodiment shown carries the water and strips horizontally along a straight line. Any bends 49 in the transition portion, whether horizontal or vertical, are preferably smooth and of low radius to reduce or eliminate flow separation and reduce breakage of the strips 28. In the embodiment of FIG. 6, the transition portion 48 is substantially straight, and disposed at an upward angle to maintain back pressure.

The strips 28 are emptied from the conduit 12 onto a screen 54 of a dewatering belt 52 of the dewatering system 50 to separate the strips 28 from the water by draining the water through the screen 54. The belt 52 then carries the dewatered strips 28 for further processing, such as blanching, freezing, and packaging.

A water collection trough 58 is disposed beneath the screen 54 to collect the water that was separated from the potato strips 28. The collected water is then carried back to the vortex tank 14 through water return piping 60 of the fluid conduit 12 and recirculated through the system in an at least partially closed circuit.

EXAMPLE

Several diffusers were constructed with a 2.5 inch entrance, an 8 inch exit, and an tapered expansion portion. The diffusers had expansion angles of 2°, 5°, and 9°, respectively. The diffusers were fitted with transparent windows, and flow visualization was conducted with high speed video. The velocity profile at the entrance of the diffusers was uniform at a volumetric flow rate of about 370 GPM, at a pipe diameter of about 2.5 inches. The following formula was used to calculate the geometry of a deceleration system employing round cross-section pipes:

$$\text{expansion angle}=a\tan((R_2-R_1)/L)$$

where $R_2$ is the radius of pipe at the inlet of the diffuser, $R_1$ is the radius of pipe at the outlet of the diffuser, and L is the length of the cone. For a pipe expansion from a 1.25 inch to a 4 inch internal radius, the expansion angle=a tan (2.75/L).

The data showed that flow separation has a significant impact on breakage. The results established that the diffuser with the 2° expansion angle produced significantly less breakage and thus produced more of the desired longer potato strips than the other diffusers. The breakage of potato strips in the diffuser with the 2° expansion angle was only about 2%. The number of strips longer than 3 inches increased by close to 10%, and the number of strips under 2 inches decreased by about 5% compared to the 5° and 9° expansion angle diffusers.

The diffusers with the 5° and 9° expansion angles showed significant flow separation, as the strips near the walls experienced backward drift. The strips that drifted backward collided with the strips that were coming forward, causing breakage. The diffuser with the 2° expansion angle did not show any such backward drift. The potato strips moved and decelerated more gently than with in the diffusers with the larger expansion angles.

While illustrative embodiments of the invention are disclosed herein, it will be appreciated that numerous modifications and other embodiment may be devised by those skilled in the art. For example, the system may be configured for performing a different process or for operating on other produce or products different than potatoes. These different systems may have different dimensions or settings, such as being set to operate at different speeds than desirable when water and potatoes are used. The system may be modified, including changes in the expansion angle of the diffuser for use with different fluids or products to be processed. Also, while a cutting device is the preferred tool for operating on the food, other tools can be used, depending on the desired operation that is necessary. Therefore, it will be understood that the appended claims are intended to cover all such modifications and embodiments that come within the spirit and scope of the present invention.

What is claimed is:

1. A food processing system, comprising:

a fluid conduit configured for directing the food carried in a fluid medium along a food path;

a food inlet operatively associated with the fluid conduit for feeding the food into the conduit;

a pump operatively associated with the conduit for pumping the fluid through the conduit in a fluid stream direction;

a processor unit associated with the conduit, disposed along the food path, and comprising a tool configured and associated with the conduit for performing a processing operation on the food; and a deceleration element operatively associated with the conduit and configured for decelerating the fluid and carried food along the food path while maintaining the fluid stream substantially free of recirculation vortices.

2. The system of claim 1, wherein the pump and conduit are configured such that the fluid enters the deceleration element at a first velocity, and the deceleration element is configured for decelerating the fluid to a second velocity that is less than about 40% of the first velocity.

3. The system of claim 2, wherein the second velocity is less than about 20% of the first velocity.

4. The system of claim 1, wherein the deceleration element comprises a tapered conduit having a longitudinal axis along the food path and having an expansion angle of about 4.5° or less.

5. The system of claim 1, the deceleration element comprises a tapered conduit having a longitudinal axis along the food path and having an expansion angle of about 3° or less.

6. The system of claim 5, wherein the tapered conduit of the deceleration element is substantially conical.

7. The system of claim 1, wherein the deceleration element comprises a tapered conduit having a longitudinal axis along the food path and having an expansion angle of about 2.5° or less.

8. The system of claim 1, wherein the deceleration element is configured to substantially eliminate any back flow of the fluid that is sufficient to significantly slow any of the carried food in relation to adjacent carried food disposed primarily outside said any back flow.

9. The system of claim 8, wherein the deceleration element is configured to substantially eliminate any back flow of the fluid that is sufficient to substantially stop or cause the carried food to move backwards compared to the stream direction.

10. The system of claim 1, wherein the deceleration element is configured for keeping the fluid flow substantially attached to the deceleration element and substantially free of slow separation.

11. The system of claim 1, wherein the deceleration element is disposed downstream from the processor unit along the food path.

12. The system of claim 1, wherein the processor unit comprises a cutter disposed along the food path and configured for cutting the food as it passes therethrough.

13. The system of claim 12, wherein the pump and conduit are configured for pumping the fluid and carried food along the food path at a sufficient speed for cutting the food at the cutter.

14. The system of claim 13, wherein the cutter comprises a plurality of stationary blades for cutting the food into longitudinal strips.

15. The system of claim 12, wherein:

the fluid is water;

the food comprises potatoes; and the system is adapted for preparing french fries with decreased amounts of slivers and nubbins.

16. The system of claim 1, further comprising an alignment unit disposed upstream of the processor unit and configured for aligning and feeding the food in a predetermined orientation into to the processor unit.

17. The system of claim 1, further comprising a separating unit disposed along the food path and configured for separating the processed food from the fluid.

18. The system of claim 17, wherein the fluid conduit comprises a transition portion extending substantially from the deceleration element to the separating unit, wherein the transition portion is configured for maintaining the fluid flow substantially free of recirculation vortices.

19. The system of claim 1, wherein the fluid is water.

20. A food processing system, comprising:

a fluid conduit configured for directing the food carried in a fluid medium along a food path;

a food inlet operatively associated with the fluid conduit for feeding the food into the conduit;

a pump operatively associated with the conduit for pumping the fluid through the conduit in a fluid stream direction;

a processor unit device associated with the conduit, disposed along the food path, and comprising a tool configured and associated with the conduit for performing a processing operation on the food;

a deceleration element operatively associated with the conduit and configured for decelerating the fluid and carried food along the food path;

a separating unit disposed along the food path and configured for separating the processed food from the fluid; and a transition portion extending substantially from the deceleration element to the separating unit, wherein the transition portion is configured for maintaining the fluid flow substantially free of recirculation vortices.

21. The system of claim 20, wherein the tool comprises a cutting device and any bends in the transition portion are configured to substantially prevent flow separation of the fluid.

22. The system of claim 20, wherein the tool comprises a cutting device and the transition portion is substantially straight.

* * * * *